United States Patent
Stoiber

(12) 
(10) Patent No.: US 6,566,771 B1
(45) Date of Patent: May 20, 2003

(54) LINEAR MOTOR AND SECONDARY PART FOR SAID LINEAR MOTOR

(75) Inventor: Dietmar Stoiber, Fürth (DE)

(73) Assignee: Siemens Linear Motor Systems GmbH & Co. KG, München (DE)

(*) Notice: Subject to any disclaimer, the term of this patent is extended or adjusted under 35 U.S.C. 154(b) by 0 days.

(21) Appl. No.: 09/831,761

(22) PCT Filed: Nov. 12, 1999

(86) PCT No.: PCT/EP99/08712

§ 371 (c)(1), (2), (4) Date: May 11, 2001

(87) PCT Pub. No.: WO00/30240

PCT Pub. Date: May 25, 2000

(30) Foreign Application Priority Data

Nov. 18, 1998 (DE) .......................... 198 53 250

(51) Int. Cl.[7] .......................... H02K 41/02; H02K 1/17; H02K 1/18
(52) U.S. Cl. .......................... 310/12; 310/12; 310/13; 310/14; 310/15
(58) Field of Search .......................... 310/12, 13, 14, 310/15

(56) References Cited

U.S. PATENT DOCUMENTS 5,763,965 A * 6/1998 Bader .......................... 310/12
5,952,742 A * 9/1999 Stoiber et al. .................. 310/12
6,134,057 A * 10/2000 Ueyama et al. ............... 359/821

FOREIGN PATENT DOCUMENTS

DE 195 01 938 A1 8/1996
DE 197 02 348 A 7/1998
JP 05 049229 A 2/1993

* cited by examiner

Primary Examiner—Nestor Ramirez
Assistant Examiner—Iraj A Mohandesi
(74) Attorney, Agent, or Firm—Henry M. Feiereisen

(57) ABSTRACT

A linear motor includes a rotor (70) and a secondary member (80), wherein the secondary member (80) carries a cover for protection against mechanical damage, aggressive liquids etc. The cover (40) has low magnetizable material and is held in place by magnetic elements (30) of the secondary member. Thus, there is no need to secure the cover additionally by gluing etc and the cover can be easily replaced. The cover can be placed, preferably, as one piece upon the secondary member, which may be made of several secondary member elements, and carries a scale for controlling the position of the motor.

30 Claims, 4 Drawing Sheets

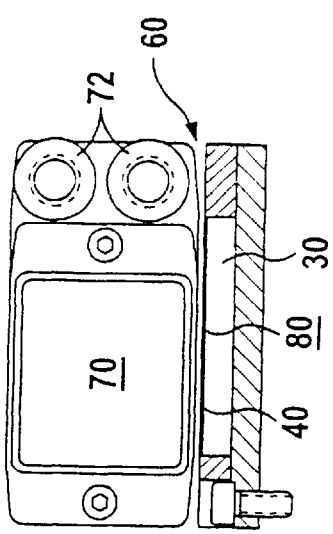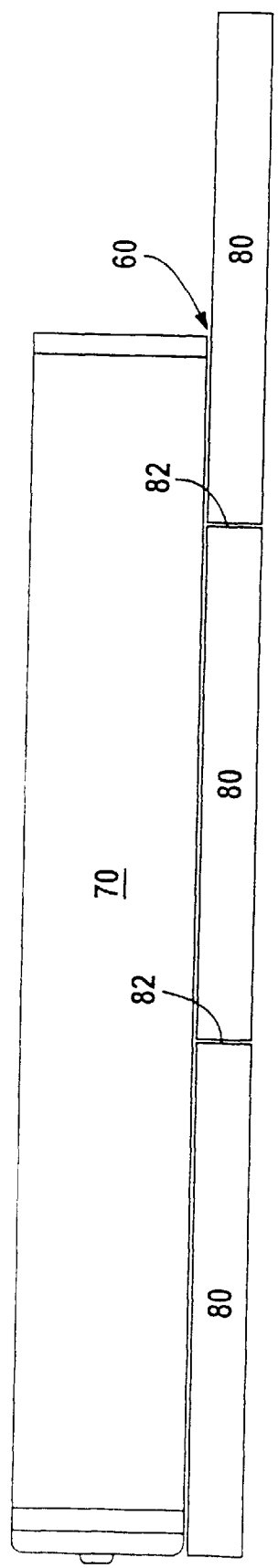

LINEAR MOTOR AND SECONDARY PART FOR SAID LINEAR MOTOR

BACKGROUND OF THE INVENTION

The invention relates to the field of linear motors and in particular to linear motors having a covered secondary member.

In general, a linear motor includes a, normally fixed, secondary or reactive member, having in case of a synchronous linear motor a plurality of magnetic elements (permanent magnets) arranged in side-by-side relationship to define a guideway for a rotor which is movable relative thereto. The rotor interacts with the magnets of the secondary member and converts this interaction in a translatory motion.

Such linear motors are used as drives in various technological fields, for example, in machine tools, machining devices such as automatic drills, automatic milling cutters, automatic lathes, automatic placement machines or automatic bonding machines, including vehicle drives in magnetic levitation trains, etc.

The structural length of the guideway depends on the intended use of the linear motor and should be at least as long as the required displacement path plus the length of the rotor. In order to have flexibility in connection with the design of linear motors of different length, the secondary members are made up of shorter secondary member elements, which are arranged, in side-by-side relationship until reaching the desired length.

The hereby created butt-joints are, however, disadvantageous in particular when exposed to rough whether, because dust, operating liquid, aggressive materials etc. can accumulate there. It also happens frequently that solid structures, tool pieces etc. migrate onto the guideway, for example, when drill bits break off from automatic drills. In the most adverse case, these solid materials may be snatched by the rotor and forced in the area of the butt-joints into the secondary member.

To avoid this, the guideway is, typically, provided with a cover, with the cover normally designed as a plastic film which is glued onto the guideway of the secondary member. Oftentimes, however, the butt-joints cannot be neutralized adequately, thereby causing unevenness that is favored of being exposed to the afore-mentioned mechanical stress; However, also the other regions can be damaged fairly easily. Thus, the plastic films must be replaced from time to time. As they are glued onto the guideways of the secondary member, replacement is relatively time-consuming and cost-intensive and causes shutdown periods of the machine.

DE 195 01 938 A1 shows a secondary member for a linear motor in which the magnetic elements are enclosed by a cover portion of, preferably, magnetic material. However, as the rotor of the linear motor is concerned here, the afore-stated problems as relating to long stators are not relevant here. Furthermore, the cover portion is connected with fastening means, namely screws, for the entire length of the rotor so that a simple exchange is not possible.

SUMMARY OF THE INVENTION

It is therefore an object of the invention to provide a secondary member for a linear motor and to provide a linear motor, with a cover reliably protecting the running surface of the secondary member and with the cover being easily replaceable.

In accordance with the invention, the cover of the secondary member has magnetizable material.

In general, it was assumed that no magnetic material should be introduced in the air gap of a linear motor, i.e. between secondary member and rotor, because the magnetic flux between rotor and secondary member is impaired. In contrast thereto, the invention has, however, recognized that this adverse affect can be exploited in a positive way. By being made of magnetizable material, the cover can be simply placed onto the surface of the secondary member and can adhere, without any need for additional means, solely by the action of the magnetic elements in the secondary member.

Hereby, it may be advantageous to provide additional fastening means at the ends of the secondary member track for anchoring upon the assembly base the cover part which projects beyond the ends of the secondary member track. On the one hand, the ends of the secondary member define particularly exposed attack areas so that an additional attachment is desirable, on the other hand, the ends may in this case also have non-magnetizable material. In accordance with the invention, no additional fastening means should be provided between the joint gaps of the secondary member, so that the cover is held between the ends of the secondary member and in particular in the area of the air gap substantially by the magnetic force only.

The cover may be made in one piece of magnetizable material, or a non-magnetic material can be provided in predetermined sections with magnetic areas, for example, strips which extend along the guideway and contact the surface of the secondary member. As the losses due to magnetic material are proportional to the layer thickness in the air gap, on the one hand, and proportional to the carrying capability, on the other hand, the magnetizable material should have a saturation induction of no more than 1.5 Tesla, at a layer thickness of preferably less than 0.5 mm. To realize a sufficient adhesion, a minimum saturation induction of 0.3 Tesla should be provided, and to ensure a sufficient function of the cover as protection against mechanical stress, a minimum layer thickness of 0.1 mm should be provided. A suitable material is, for example, special steel with a saturation magnetization of ¾ to 1.5 Tesla.

Covers in the range of the afore-stated data adhere, on the one hand, sufficiently firm onto the secondary member, afford protection against mechanical damage and can be applied in one piece over the entire length of the guideway and, for example, delivered as roll material; the power losses are approximately in the range of 5 to 6% of the original thrust force.

As the material is sufficiently firm against mechanical stress and can be designed as a single-piece web for stable positioning on the secondary member, a preferred variation includes the application of a length scale onto the material, for example, by engraving, imprinting, bonding etc. Such length scales, which are necessary for the operation of a linear motor for position control, have been attached heretofore laterally on the secondary member and read by a reading head on the rotor. This lateral attachment has, however, the effect that a possible horizontal tilting of the rotor with respect to the secondary member may cause a measuring error in longitudinal direction of the scale. By attaching, in contrast thereto, the scale on the cover of the secondary member, preferably in the middle of the guideway, a tilting of the rotor leads only to a lateral shift of the reading head upon the scale but not to a shift in the longitudinal direction, so that the configuration according to the invention results further in a more accurate measurement of the position.

Details of the design of the scale are not described here as such scales, as explained, are known to the artisan.

BRIEF DESCRIPTION OF THE DRAWING

An exemplified embodiment of the invention will now be described in more detail with reference to the attached drawings, in which:

FIG. 4 is a front view of the linear motor with cross section through the secondary member;

FIG. 5 is a side view of the linear motor;

DETAILED DESCRIPTION OF PREFERRED EMBODIMENTS

As the structure of a secondary member for a linear motor is presumed to be known, the following description refers only superficially thereto.

Figure 1:
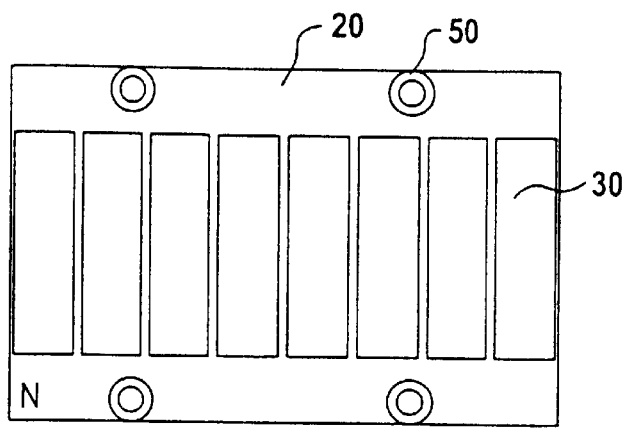
FIG. 1 shows a top view of a secondary member element without cover.
Figures 2, 2A:
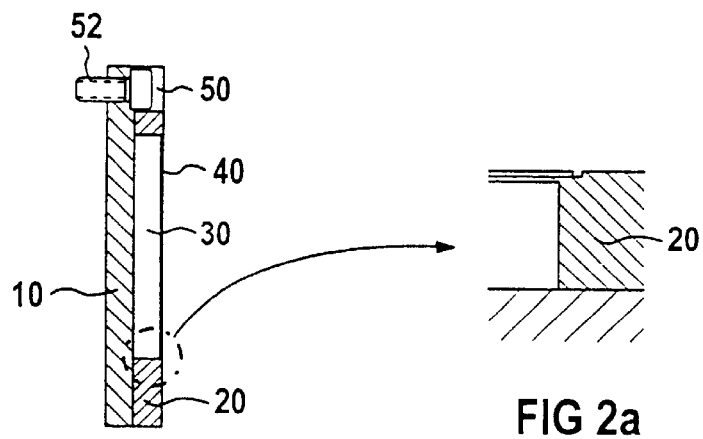
FIG. 2 shows a side cross sectional view through a secondary member element with cover.
FIG. 2a shows a detail of FIG. 2.

According to FIGS. 1 and 2, a row of magnetic elements 30 is arranged in spaced-apart disposition on a base plate 10. Synthetic resin as casting material 20 is cast around these magnetic elements for enclosing the magnetic elements on all sides with the exception of the base to thereby form a compact secondary member element 80 which can be mounted at a proper position via boreholes 50 and bolts 52.

Provided on the secondary member or secondary member elements according to the invention is a cover 40 of low magnetic material, such as for example, special steel. This cover is placed in a recess 45 in the casting material 20, as shown in particular in FIG. 2a. The recess 45 may be formed during casting of the magnetic elements or by a separate milling step. The depth of the recess should correspond to the sheet thickness to realize a substantially even surface of the secondary member.

FIG. 4 shows a linear motor, with the rotor 70 interacting with the secondary member element 80 via an air gap 60. Structure of the rotor 70 with connections 72 etc. is generally known and not explained in more detail.

Figure 5A:
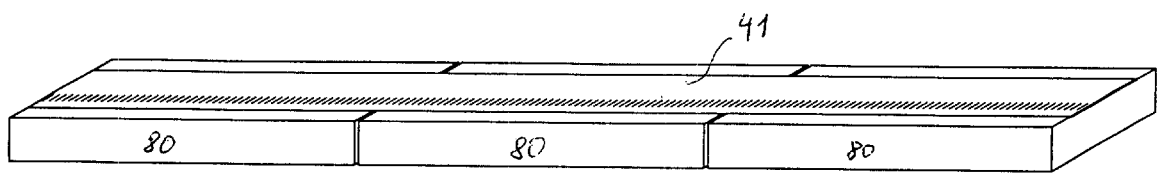
FIG. 5a is a perspective view of the secondary member in the form of a plurality of secondary member elements with attached scale.

FIG. 5 shows a side view of the linear motor. This illustration depicts that several secondary member elements 80 can be arranged in side-by-side relationship to realize a desired length of the secondary member.

Figure 3:
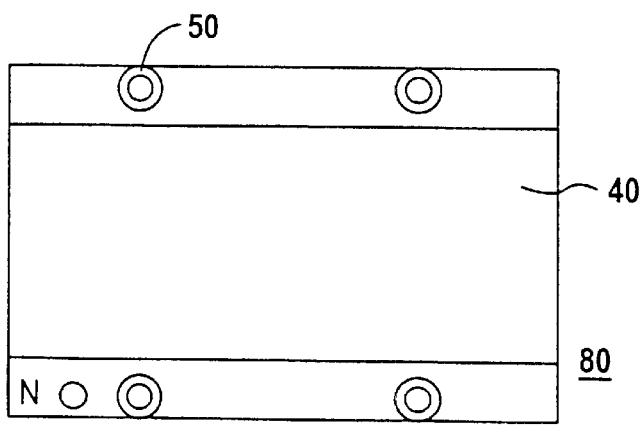
FIG. 3 is a plan view of a secondary member element with cover.

Although it is generally possible to provide each individual secondary member element with a separate cover 40, as shown in FIG. 3, the butt joints 82 between adjacent secondary member elements still extend to the surface of the guideway.

Therefore, it is preferred to use a continuous web material for the cover, which can be shipped, for example, as roll material and attached continuously from one end of the guideway to the other end. In this case, it is especially advantageous when the web material carries a scale 41, which can be registered by a respective reading head on the rotor. The scale 41 is preferably attached in the middle of the web material or cover, respectively, as schematically depicted by the center line in FIG. 3 and shown more clearly in FIG. 5a.

The cover is held in place by all magnetic elements of the secondary member and thus reliably protected against displacement in horizontal direction. For removal, the cover can be simply lifted off by overcoming the action of a respective magnetic element.

Figure 6:
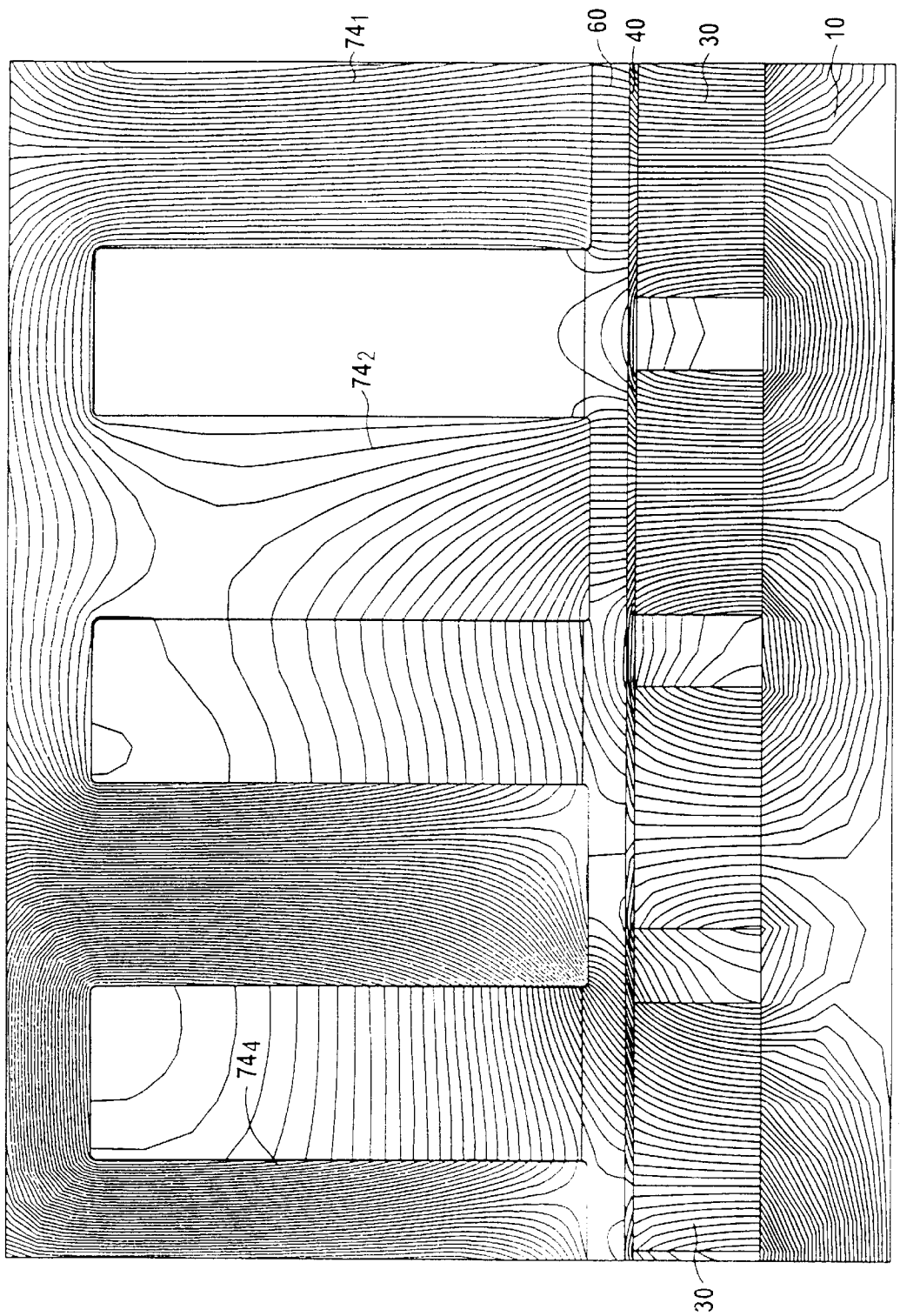
FIG. 6 is a schematic longitudinal section through the linear motor depicting the flow of the magnetic field lines.

FIG. 6 shows schematically the flow of the field lines, when the linear motor is switched on, whereby the teeth of the armature in the rotor are designated by $74_1, \ldots, 74_4$.

The flow of the field lines is calculated with the assistance of the finite element method and shows the impact of the magnetic cover 40 on the magnetic field.

What is claimed is:

1. A secondary member assembly for a linear motor, comprising a secondary member in the form of a plurality of secondary member elements arranged in side-by-side relationship, each of the secondary member elements including magnetic elements to define a guideway for a rotor of the linear motor; and a flat cover sized to extend over at least two said secondary member elements for covering the magnetic elements, wherein the cover has at least predetermined regions made of magnetizable material.

2. The secondary member assembly of claim 1, wherein the cover is placed upon a surface of the secondary member and adheres to the surface of the secondary member solely by the action of the magnetic elements.

3. The secondary member assembly of claim 1, wherein the secondary member has opposite ends, and further comprising fastening means mounted to the ends of the secondary member for securement of the cover upon the secondary member.

4. The secondary member assembly of claim 1, wherein the secondary member is configured as stator for the linear motor.

5. The secondary member assembly of claim 1, wherein the cover is made in one piece of magnetizable material.

6. The secondary member assembly of claim 1, wherein the cover has at least one strip of magnetizable material extending along the guideway.

7. The secondary member assembly of claim 1, wherein the magnetizable material has a saturation induction of maximal 1.5 Tesla.

8. The secondary member assembly of claim 1, wherein the magnetizable material has a saturation induction of at least 0.3 Tesla.

9. The secondary member assembly of claim 1, wherein the cover has a thickness of less than 0.5 mm.

10. The secondary member assembly of claim 1, wherein the cover has a thickness of at least 0.1 mm.

11. The secondary member assembly of claim 1, wherein the magnetizable material is special steel.

12. The secondary member assembly of claim 1, wherein the cover has a surface, and further comprising a scale provided on the surface and extending along the guideway.

13. The secondary member of claim 1, wherein the cover extends in one piece over all the secondary member elements.

14. The secondary member assembly of claim 1, wherein the cover extends over the secondary member elements such as to cover joint gaps between the neighboring secondary member elements, to thereby eliminate a need for separate fastening means in the joint gaps.

15. A linear motor, comprising a rotor; a secondary member in the form of a plurality of secondary member elements arranged in side-by-side relationship, wherein each of the secondary member elements has magnetic elements to define a guideway for the rotor; and a flat cover sized to extend over at least two of the secondary member elements for covering the magnetic elements, wherein the cover has at least predetermined regions made of magnetizable material.

16. The linear motor of claim 15, wherein the cover is placed upon a surface of the secondary member and adheres to the surface of the secondary member solely by the action of the magnetic elements.

17. The linear motor of claim 15, wherein the secondary member has opposite ends, and further comprising fastening means mounted to the ends of the secondary member for securement of the cover upon the secondary member.

18. The linear motor of claim 15, wherein the secondary member is configured as stator.

19. The linear motor of claim 15, wherein the cover is made in one piece of magnetizable material.

20. The linear motor of claim 15, wherein the cover has at least one strip of magnetizable material extending along the guideway.

21. The linear motor of claim 15, wherein the magnetizable material has a saturation induction of maximal 1.5 Tesla.

22. The linear motor of claim 15, wherein the magnetizable material has a saturation induction of at least 0.3 Tesla.

23. The linear motor of claim 15, wherein the cover has a thickness of less than 0.5 mm.

24. The linear motor of claim 15, wherein the cover has a thickness of at least 0.1 mm.

25. The linear motor of claim 15, wherein the magnetizable material is special steel.

26. The linear motor of claim 15, wherein the cover has a surface, and further comprising a scale provided on the surface and extending along the guideway.

27. The linear motor of claim 15, wherein the cover extends in one piece over all the secondary member elements.

28. The linear motor of claim 15, wherein the cover extends over the secondary member elements such as to cover joint gaps between the neighboring secondary member elements, to thereby eliminate a need for separate fastening means in the joint gaps.

29. A secondary member assembly for a linear motor, comprising a secondary member in the form of a plurality of secondary member elements arranged in side-by-side relationship, each of the secondary member elements including magnetic elements to define a guideway for a rotor of the linear motor; and a flat cover sufficiently sized to extend over neighboring secondary member elements so as to cover joint gaps between the neighboring secondary member elements, wherein the cover has at least predetermined regions made of magnetizable material.

30. The linear motor of claim 15, wherein the cover is placed upon a surface of the secondary member in an area of an air gap between the secondary member and the rotor.

* * * * *